(12) United States Patent
Chen

(10) Patent No.: US 8,630,765 B2
(45) Date of Patent: Jan. 14, 2014

(54) OBD II-COMPLIANT DIAGNOSTIC PC TABLET AND METHOD OF USE

(75) Inventor: Ieon Chen, Laguna Hills, CA (US)

(73) Assignee: Innova Electronics, Inc., Irvine, CA (US)

( * ) Notice: Subject to any disclaimer, the term of this patent is extended or adjusted under 35 U.S.C. 154(b) by 1557 days.

(21) Appl. No.: 11/601,158

(22) Filed: Nov. 17, 2006

(65) Prior Publication Data

US 2008/0119981 A1 May 22, 2008

(51) Int. Cl.
*G06F 7/00* (2006.01)

(52) U.S. Cl.
USPC .................. 701/33.2; 701/31.4; 701/32.7

(58) Field of Classification Search
USPC ............ 701/1, 2, 29, 31, 33, 33.2, 32.7, 31.4; 340/438, 441
See application file for complete search history.

(56) References Cited

U.S. PATENT DOCUMENTS

| | | | |
|---|---|---|---|
| 5,758,300 A * | 5/1998 | Abe .............................. | 455/424 |
| 5,916,286 A * | 6/1999 | Seashore et al. ................ | 701/29 |
| 6,225,898 B1 * | 5/2001 | Kamiya et al. ................ | 340/505 |
| 6,263,322 B1 * | 7/2001 | Kirkevold et al. ............. | 705/400 |
| 6,271,840 B1 * | 8/2001 | Finseth et al. ................ | 715/236 |
| 6,285,932 B1 * | 9/2001 | de Bellefeuille et al. ....... | 701/33 |
| 6,295,492 B1 * | 9/2001 | Lang et al. .................... | 701/32.4 |
| 6,314,422 B1 * | 11/2001 | Barker et al. ......................... | 1/1 |
| 6,330,499 B1 * | 12/2001 | Chou et al. .................... | 701/31.4 |
| 6,434,455 B1 * | 8/2002 | Snow et al. ..................... | 701/33 |
| 6,542,799 B2 * | 4/2003 | Mizutani et al. ............... | 701/33 |
| 6,556,904 B1 * | 4/2003 | Larson et al. ................ | 701/29.6 |
| 6,941,203 B2 * | 9/2005 | Chen .............................. | 701/33 |
| 6,947,816 B2 * | 9/2005 | Chen .............................. | 701/33 |
| 6,965,903 B1 * | 11/2005 | Agarwal et al. ....................... | 1/1 |
| 7,055,062 B2 * | 5/2006 | Shah et al. ...................... | 714/15 |
| 7,376,497 B2 * | 5/2008 | Chen .............................. | 701/29 |
| 7,477,968 B1 * | 1/2009 | Lowrey et al. .................. | 701/29 |
| 7,516,193 B2 * | 4/2009 | Motoyama et al. ........... | 709/217 |
| RE40,798 E * | 6/2009 | Chen .............................. | 701/33 |
| 7,734,390 B2 * | 6/2010 | Chen .............................. | 701/33 |
| 2002/0156692 A1 * | 10/2002 | Squeglia et al. ............... | 705/26 |
| 2005/0113991 A1 * | 5/2005 | Rogers et al. .................. | 701/29 |
| 2006/0142910 A1 * | 6/2006 | Grier et al. ...................... | 701/29 |
| 2007/0294001 A1 * | 12/2007 | Underdal et al. .............. | 701/29 |
| 2008/0177438 A1 * | 7/2008 | Chen et al. ...................... | 701/33 |
| 2009/0259358 A1 * | 10/2009 | Andreasen ..................... | 701/33 |

* cited by examiner

*Primary Examiner* — James Trammell
*Assistant Examiner* — Jerrah Edwards
(74) *Attorney, Agent, or Firm* — Stetina Brunda Garred & Brucker (57) ABSTRACT

An OBD II-compliant diagnostic PC tablet and method are provided. The tablet enables the simultaneous display of diagnostic data from multiple systems. Further, the tablet enables retrieval of potential solutions in response to the diagnostic data. The tablet may be used to retrieve the diagnostic data from a given vehicle system. The tablet features a display screen, an input node, and a processor. The tablet may communicate with one or more remote databases obtaining diagnostic summaries therefrom. Thus, the computer receives the diagnostic data vehicle system, derives diagnostic information therefrom, and can use external databases to derive potential diagnostic solutions therefrom.

26 Claims, 4 Drawing Sheets

OBD II-COMPLIANT DIAGNOSTIC PC TABLET AND METHOD OF USE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates generally to automotive diagnostic equipment, and more particularly to an OBD II-compliant diagnostic PC tablet.

One of the drawbacks associated with vehicle maintenance and repair includes the inefficient use of resources. In fact, despite the substantially detailed and specific information accessible to a mechanic, the mechanic is typically limited in his/her own personal ability to meaningfully synthesize the vast amounts of data and information they are given. As described below, the current diagnostic technologies frequently relegate the mechanic to respond to the available information, rather than directing access to a broader array of available information. Thus, with so much information available, and yet so little control over the information, the diagnostic process may be inefficient. There is a need in the art to create an economy of resources, to allow an efficient mating of information and diagnostic functions.

Part of the increase in information available to mechanics is due to the increasing sophistication of the computer control systems of modern motor vehicles (often referred to as on-board diagnostics or "OBD"). Vehicle computer control systems monitor information from various vehicle sensors to optimize performance of the individual systems of the vehicle. For example, the computer control system may provide maximum engine performance with the least amount of air pollution and the best fuel efficiency possible. Whenever the vehicle develops problems, those problems are often reflected in information within or derived from the computer control system, e.g. trouble codes, monitor status and real time data. This system alerts the driver, and may later be studied by a mechanic in order to diagnose the problem.

The experienced mechanic is able to use the computer control system to diagnose and solve vehicle problems. The computer control system employs various sensors, switches, and actuators to monitor the vehicle's systems. Each of these control devices may function in a cooperative relationship with each of the respective systems of the vehicle. The electronic control devices send information to the on-board computer about such parameters such as temperature and density of the outside air, the speed of the engine, the amount of fuel delivered, etc.

The on-board computer may also scan for any potential problems using the sensors. If a problem is detected, the on-board computer makes a record of the problem, first translating the problem into a corresponding numeric code, and then storing the numeric code, which is often referred to as a diagnostic trouble code or a fault code, in its memory for later retrieval. Thus, by retrieving the diagnostic trouble codes and other monitor/status information (collectively referred to as diagnostic information), the mechanic may identify a particular problem detected by the control system and pursue and corresponding remedy in servicing the vehicle. In recent years, a variety of hand-held or portable code readers have been developed that troubleshoot faults or problems by detecting the diagnostic trouble codes as provided by the computer control system. These code readers are therefore configured to electronically communicate with a vehicle's on-board computer control system in order to access the stored diagnostic trouble codes. In order to obtain access to the computer control system's diagnostic trouble codes, the vehicle is equipped with a connection point, or data port, which allows the code reader to interface with the computer control system. OBD-II compliant vehicles are configured to have an on-board computer control system with a data port equipped to receive a sixteen pin data connector cable from the code reader. The code reader typically includes a display for indicating received diagnostic trouble codes. Often, code readers may be used in connection with a booklet containing problem description data correlated to the diagnostic trouble codes or other diagnostic information. Some code readers display the problem description data correlated to the diagnostic trouble codes stored in memory. Code readers may incorporate user interfaces that may be navigated to access stored data.

Once the diagnostic trouble codes are retrieved, the mechanic may utilize various sources of information to fix whatever problem has been detected. For example, the mechanic may have many volumes of books and other materials that provide detailed information on any given vehicle. Other resources, such as computer programs and online manuals are also available. Additionally, online or telephonic resources such as experts, other mechanics, or technicians may be available to personally assist the mechanic and to answer any questions. In some cases, after receiving the diagnostic trouble codes, a mechanic may simply pass on these diagnostic trouble codes and related information to a remote agency that diagnoses and solves the problem; the agency then advises the mechanic how to solve the problem. Further, Technical Service Bulletins (TSB's) and web based resources provide listings of common problems discovered in certain years and models of a given vehicle and attempted solutions. Such information may be highly useful to narrow the possible causes or solutions to certain vehicle problems.

Although these resources are helpful and may eventually provide the mechanic with the proper instructions on how to solve a vehicle problem, there remains substantial inefficiencies in the diagnostic and solution process. Indeed, the process of referring to diagnostic displays, publications, and telephonic service agencies is cumbersome and inefficient, and well beyond the functionality of conventional code readers. As such the mechanic's actions may require coordinated or serial use of multiple tools and materials. Ultimately, the action taken may be wholly dictated by remote third parties and programs, allowing the mechanic little or no input or control over the diagnostic and solution processes. Thus, the expertise of the mechanic is not well mated to the resources available to diagnose many vehicle problems. While the resources are available to the mechanic, the ability to access, display, link and correlate those resources with diagnostic data, is a bottleneck in the diagnostic process.

Very little has been done to efficiently blend the skill and expertise of the mechanic with the vast amounts of raw and processed information now available. Though the mechanic may obtain access to vast amounts of additional information, the process and apparatus for selectively integrating information from other sources is typically cumbersome, time consuming, and not easily adaptable to the requirements and preferences of the responsible mechanic. For "do it yourselfers" (DIY) or others not having access to means to integrate data and resources, the bottleneck may substantially impair the diagnostic process.

Therefore, there is a need in the art for a diagnostic device that effectively organizes relevant diagnostic information and data. There is a need in the art for a diagnostic device that allows the mechanic orchestrate access to vehicle diagnostic information and access to related external resources. Further, there is a need in the art for a diagnostic device that not only presents a display of malfunctions and problems, but also provides the user with associated solutions to each of the malfunctions and problems. There is a need in the art for a apparatus that allows the mechanic to centralize relevant data from vehicular systems and sensors, informational resources, the TSB, and third parties in order to allow the mechanic to efficiently review and utilize such data to diagnose and solve the vehicle's problem.

BRIEF SUMMARY

In accordance with the present invention, a handheld diagnostic device, such as an OBD II-compliant diagnostic PC tablet, and method for automotive diagnosis are provided. The tablet permits the accessing and displaying diagnostic data and a selected information from local or remote databases, correlated to select diagnostic data from a vehicle on board systems. The tablet allows the mechanic to access vehicle data from the on board computer and sensors, and to access and use only the information pertinent to the problem. As such, the mechanic need not sift through vast amounts of information or wait for others to do the same. The tablet may also enable the simultaneous display of diagnostic data from multiple vehicle systems.

According to an embodiment of the present invention, the tablet includes a display screen, a communications interface, and a computer, or processor. The display screen is preferably a touch-sensitive display screen. The communications interface may electrically communicate with the input module for obtaining diagnostic data therefrom. The diagnostic data may be representative of a system status.

The computer may be configured to process the diagnostic data from the communications interface to obtain a diagnostic trouble code, monitor status or other data correlated to the system status. In one embodiment, the communications interface may be configured to establish an electronic communications link between the computer and an external database for transmitting the diagnostic trouble code(s) to the external database(s). After the diagnostic trouble code(s) and/or other diagnostic data is sent to the external database(s), the external database(s) can each return a diagnostic summary in response to the received diagnostic data. The diagnostic summary may include multiple information results, correlated to the diagnostic data.

In an embodiment, the communications interface may include an input node that is in communication with one or more input modules. As such, the input node may serve as a dedicated communication interface for the obtaining the diagnostic data from the input modules.

According to an aspect of the present invention, a tablet may be operative to display diagnostic data from multiple input modules, or current and prior data from the same system, simultaneously. This advantageous feature may allow a user to compare and contrast the diagnostic data. Further, the diagnostic data may be from multiple systems, or may be from an individual system and include current diagnostic data, and prior (or idealized) diagnostic data. In addition, the tablet may be operative to overlay or otherwise display diagnostic data from multiple input modules on a single display screen in order to facilitate ready comparison and use of the diagnostic data.

In addition, a touch-sensitive screen may be provided to facilitate user selection of the information result displayed in the diagnostic summary. The computer may be configured to allow a user to download a selected information result, or related external resource information, in response to the user selection on the touch screen, via the electronic communications link.

The tablet thus allows a mechanic to readily retrieve, display and select information results from various databases that feature pertinent information for the systems and diagnostic data. In this regard, the diagnostic summary presented to the mechanic is organized and simplified in order to allow the mechanic to selectively access information results according to the mechanic's own preferences and initiative; the mechanic thus becomes the master of the information and may download and view only those information results that are deemed pertinent to the problem, thereby mitigating inefficiencies in the utilization of resources.

In one implementation, the remote communications interface may be configured to establish a wireless electronic communications link between the tablet and the external database. The input node of the tablet may be a wireless communications port that is operative to wirelessly communicate with the at least one input module to receive the diagnostic data therefrom. The wireless communications port may be BlueTooth or WiFi compatible. However, it is contemplated that various other wireless standards and technologies may be used.

In order to facilitate maximum functionality, embodiments of the present invention may utilize various types of input modules. Input modules may include vehicle on board device, such as the vehicle onboard computer and sensor modules. The input modules may also include separate diagnostic devices connected to the on board devices. For example, the input module may be an OBD II "lump-on-cable" module; a DMM module; an oscilloscope module; a gas analyzer module; a battery tester module; a sensor tester module; an ignition system tester module; and other modules that may be utilized for diagnostic work, such as for vehicles and automobiles. Thus, a plurality of input modules may be used.

According to another embodiment of the present invention, a remote server(s) may be included wherein the remote server(s) is in communication with the tablet. A preferred method of communication is wireless, and such may be facilitated as described above and as known in the art. In use, the tablet may be configured to transmit an upload signal to the remote server, which upload signal includes information representative of the diagnostic trouble code and/or other diagnostic data. The remote server(s) may also access a remote database (s) utilizable to analyze the diagnostic data from the upload signal and retrieve related vehicle data.

In accordance with yet another embodiment of the present invention, a diagnostic method is provided. In one implementation the method comprises: receiving sensed diagnostic data from a system, the diagnostic data being representative of some aspect of a system status; referencing the diagnostic data with a database(s) to produce a diagnostic summary, the diagnostic summary including one or more information results correlated to the diagnostic data; displaying the diagnostic summary for review; selecting one or more information results of the diagnostic summary; downloading data related to the selected information result to the diagnostic PC tablet; and displaying the data and/or selected information result for review.

In one embodiment of the method, the referencing step may include referencing a diagnostic trouble code with a trouble code descriptor stored in a local database in the tablet or remotely. Alternatively, the referenced data may include at least one of diagnostic procedures, repair procedures, known problems, notifications about parts (either new and/or improved), warranty information, and service manual updates, maintained locally or in a remote database(s).

According to another embodiment of the method, the displaying the diagnostic summary step may include displaying the diagnostic summary for review on a display screen of the diagnostic PC tablet. The diagnostic data displayed may include diagnostic data from multiple input modules simultaneously, on a single display chart.

Furthermore, the selecting the information result step may include using a touch-sensitive screen to select the information result of the diagnostic summary. Finally, the step of processing the diagnostic data may include: transmitting an upload signal being representative of the diagnostic data to a remote server; utilizing a remote database(s) on the remote server to analyze the diagnostic data from the upload signal; and transmitting a download signal to the tablet from the remote server being representative of that analysis.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Referring now to the drawings wherein the showings are for purposes of illustrating preferred embodiments of the invention only, and not for purposes of limiting the same, FIGS. 1-4 illustrate exemplary embodiments of a portable, handheld diagnostic PC tablet 10 that may receive diagnostic data from an input module 12 and display the diagnostic data, a diagnostic summary 14, and an information result(s) 16 related to at least one system 18. The system 18 may be of a vehicle 20 (shown as an automobile).

Figure 2:
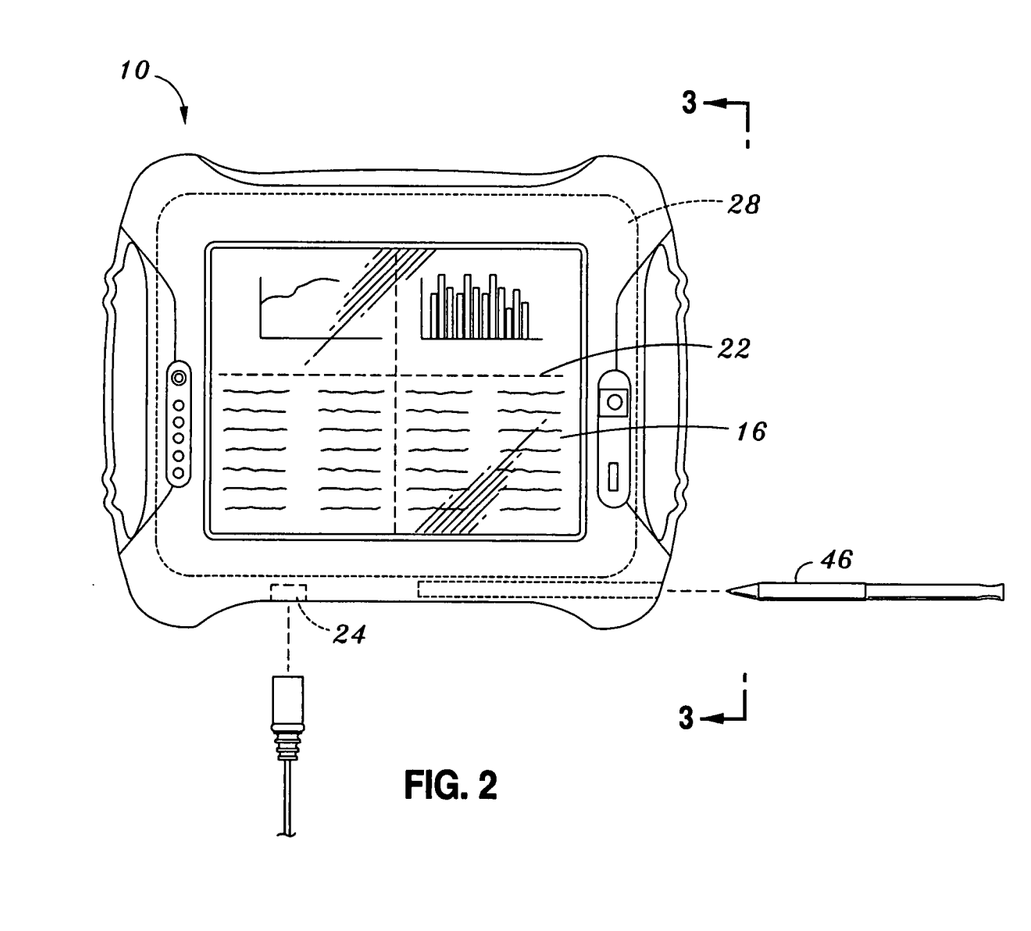
FIG. 2 is a front view of the tablet according to an implementation of the present invention.

According to an advantageous aspect of the present invention, the tablet 10 may be used to display diagnostic data obtained from individual or multiple systems 18. In addition, the tablet 10 may not only present the diagnostic data to alert the user as to any malfunctions or problems of a system 18, but the tablet 10, either alone or in concert with external resources, may also be operative to present potential solutions associated with each of the malfunctions, as explained below. Embodiments of the present invention may thus be utilized to provide simultaneous analysis and review of diagnostic data of individual or multiple systems 18, i.e., the display may include a split screen (as shown in FIG. 2) to enable simultaneous review of data from multiple systems 18.

As mentioned above, one of the drawbacks associated with contemporary vehicle maintenance and repair includes the inefficient use of resources. In fact, despite substantially detailed and specific information available, a user such as an automotive mechanic may be unable to use his/her own personal ability to meaningfully synthesize, from a single site, the vast amounts of information they are given. As described below, the tablet 10 provides the mechanic with a simple, hand held tool, that allows control over the information in order to make the diagnostic process more efficient. Thus, resources, such as computational and informational resources, may be economized and information and diagnostic skill may be mated for efficiency.

Figure 4:
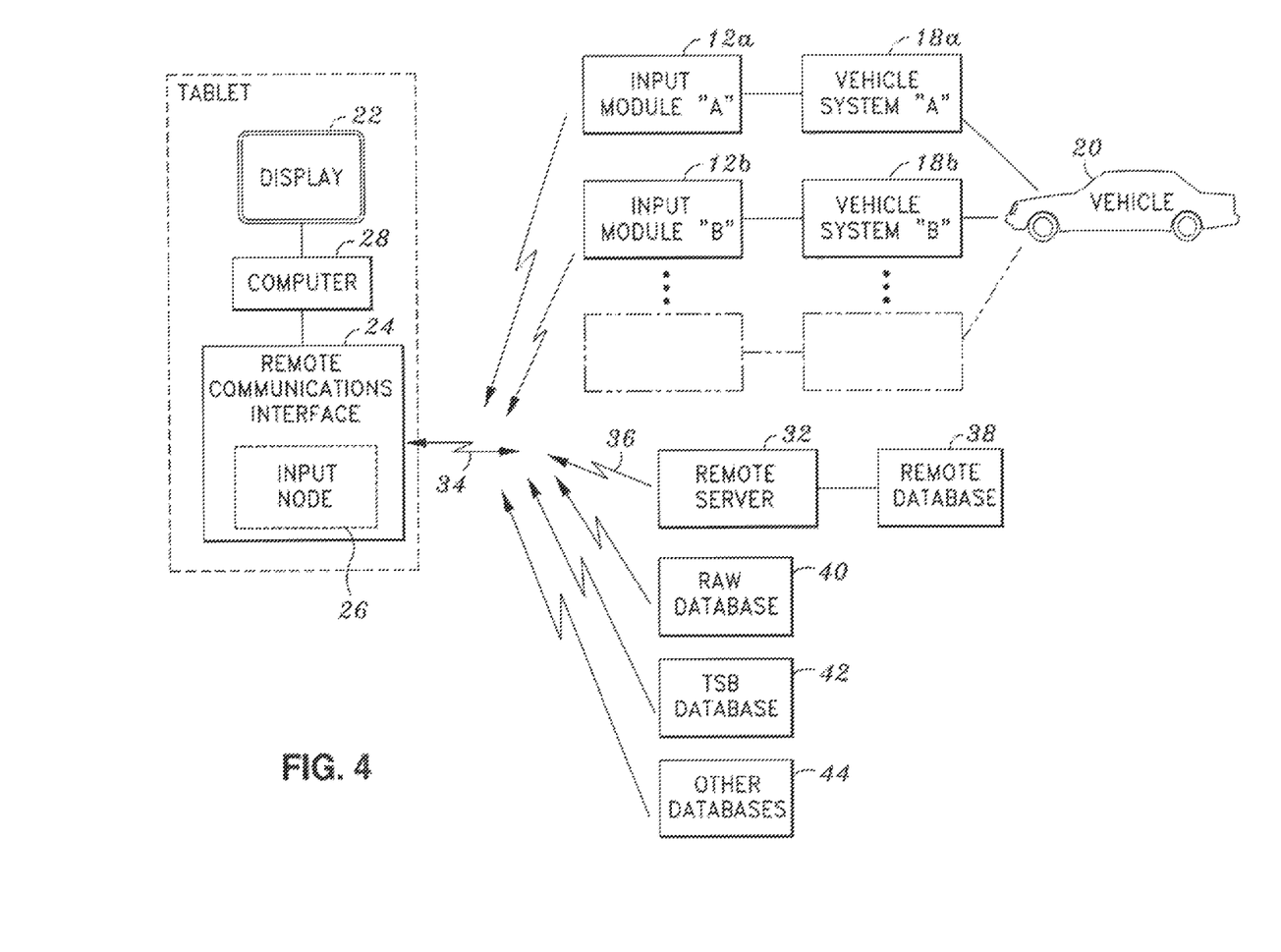
FIG. 4 is a schematic representation of the tablet being in electrical communication with input modules, a remote server, and various databases, according to an implementation of the present invention.

Most modern vehicles 20 are now OBD-II-compliant. Thus, a vehicle device or system 18 may thus be compatible with OBD-II devices. As illustrated in FIG. 4, each of these systems 18a, 18b may provide the diagnostic data relative to the particular device or system. For example, such systems may include an ignition system, an electrical system, a gas analyzer system, and others as are known in the art. Therefore, the systems 18a, 18b are in electrical communication with the input modules 12a, 12b which receive the diagnostic data and are operative to transmit the diagnostic data to the PC tablet 10.

As illustrated in FIGS. 1-4, according to an implementation of the present invention, the tablet 10 includes a display screen 22, a communications interface 24, and a processing computer 28. These elements are preferably assembled to form a compact, portable, hand-held unit that is durable and operative to enable a user to access the diagnostic data of various systems 18a, 18b, as shown in FIG. 4. The diagnostic data is representative of a device or system status. As discussed herein, the data may correlate to any of a variety of systems, including vehicle systems, electronic systems, computer systems, mechanical systems, etc. The data may provide information related to the functioning, maintenance needs, and/or other readings from the system 18.

The communications interface 24 is in electrical communication with the input module 12 in order to receive the diagnostic data from the input module 12. The input module 12 senses the diagnostic data from the systems 18a, 18b, and is operative to transmit the diagnostic data to the communications interface 24 of the diagnostic PC tablet. The electrical communication between the remote communications interface 24 and the input module 12 may be wireless or wired, as respectively illustrated in FIGS. 1 and 2. In an embodiment of the present invention, a remote communications interface 24 may include an input node that is in electrical communication with the vehicle input module 12. The input node may thus serve as a dedicated communication interface for the receiving the diagnostic data from the vehicle input module 12. The tablet 10 may be configured to include a single input node that communicates with a plurality of input modules 12. However, it is also contemplated that a plurality of input nodes may be utilized to individually communicate with a plurality of respective input modules 12. Thus, the tablet 10 may include various capabilities for receiving the diagnostic data from any and all input modules 12 related to one or more systems 18.

Figure 1:
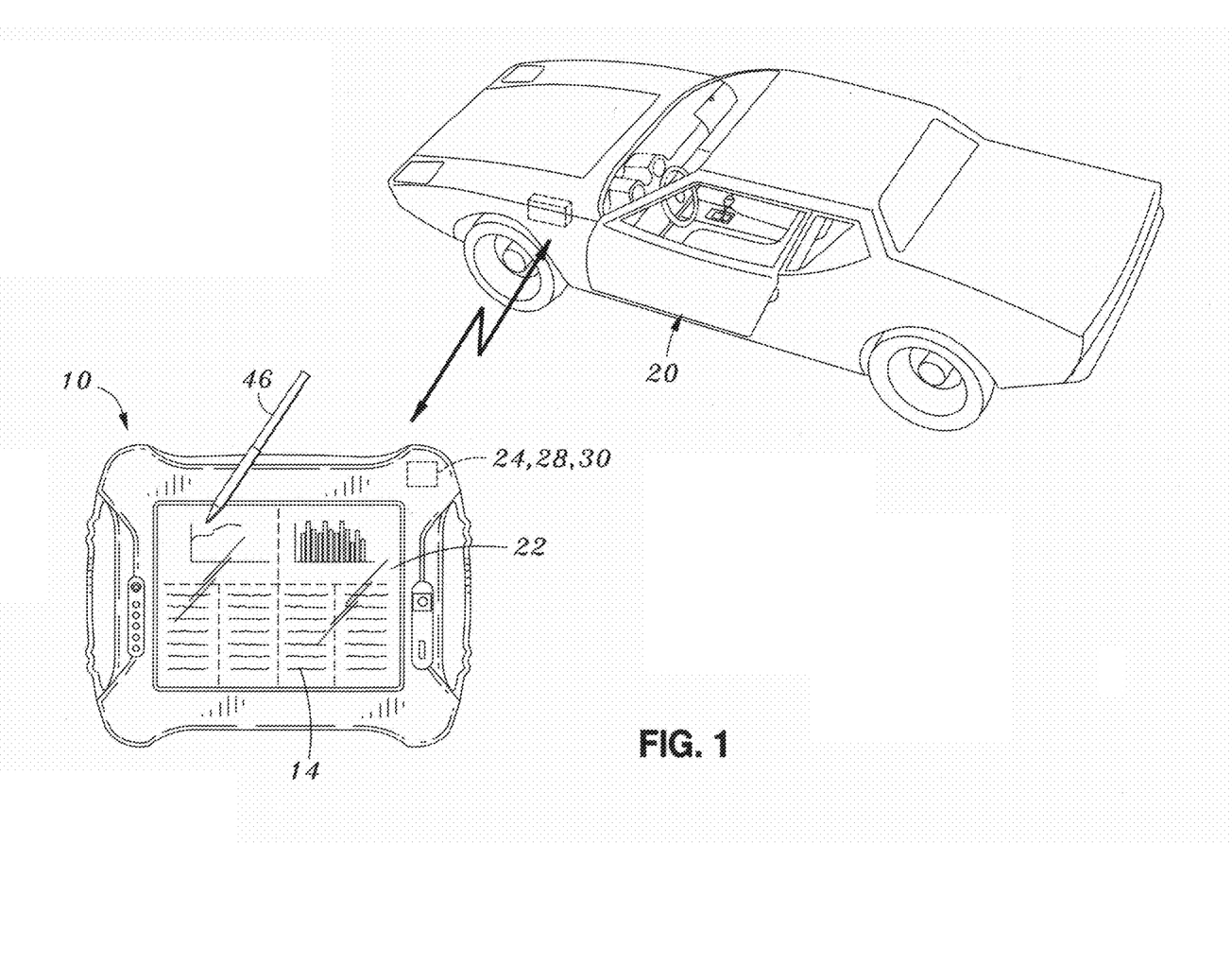
FIG. 1 illustrates an exemplary embodiment of a diagnostic PC tablet that may communicate with a system of a vehicle in order to provide a detailed presentation of diagnostic data from the system.

For example, the tablet 10 may be configured to receive diagnostic data from at least one input module 12 that is operatively linked to a vehicle diagnostic port. The diagnostic port is frequently included in most modern vehicles and may be utilized to transmit the diagnostic data as obtained from the individual systems 18 of the vehicle 20. The diagnostic port may be in electrical communication with at least one of the systems 18 and is often in electrical communication with several, if not all systems 18. Thus, in some instances, the input module 12 may be electrically connected to an existing diagnostic port of the vehicle 20. However, the input modules 12 may have wireless communication capabilities, as illustrated in FIG. 1. As mentioned, a single input module 12 may be configured to communicate with a plurality of systems 18.

In order to facilitate maximum functionality, embodiments of the present invention may be configured to receive diagnostic data from various types of input modules 12, either on board devices or external devices configured to test or otherwise communicate with on board devices or systems. For example, the input module 12 may be an OBD II "lump-on-cable" module; a DMM module; a gas analyzer module; a battery tester module; a sensor tester module; an ignition system tester module; and other modules that may be utilized for diagnostic work, such as for vehicles 20 and automobiles. Thus, a plurality of input modules 12 may be used or a single input module 12 may be used.

As illustrated in FIG. 1, the tablet remote communications interface 24 and/or the input node 26 may be configured as a wireless communications port 30 that is operative to wirelessly communicate with the input module 12 in order to wirelessly receive the diagnostic data therefrom. The wireless connection may be facilitated by utilizing Bluetooth or Wi-Fi connectivity. Thus, the wireless communications port 30 and the input modules 12 may each be Bluetooth or Wi-Fi compatible. In addition, other wireless communication standards may be utilized. It is also contemplated that the remote communications interface 24 and/or the input node may be in wired communication with the input module(s) 12.

The computer 28 may electrically communicate with the remote communications interface 24 and/or the input node to receive the diagnostic data therefrom. The computer 28 may be configured to process the diagnostic data, e.g. in order to obtain a diagnostic trouble code, a trouble code descriptor, monitor data, or other data correlated to the received diagnostic data. As such, the computer 28 may be able to reference the diagnostic data with an internally-held database(s). Further, as shown in FIG. 4, the computer 28 may be in electrical communication with a remote server 32 via a hard wire electrical communications link to the remote communications interface 24. The remote communications interface 24 may alternatively/additionally be configured to establish a wireless electronic communications link, such as between the remote server 32 and the computer 28. In this implementation, the computer 28 may be configured to transmit an upload signal 34 to the remote server 32, which upload signal 34 includes information representative of the diagnostic data. The remote server 32 may then use the diagnostic data to determine, interpret or otherwise process the diagnostic trouble code or other data. The analysis of the diagnostic data may then be transmitted by the remote server 32 to the tablet 10 via a download signal 36.

Thus, the remote server 32 may be operative analyze the diagnostic data and identify or otherwise analyze any problems or failures have been detected in the various systems 18. The remote server 32 may utilize OBD-II system signals and other data, as directed by the user, to process and evaluate the diagnostic data. In yet other embodiments, it is contemplated that the remote server 32 may access other databases 40, 42, 44, as may be necessary. The remote server 32 may be a centrally located server that provides individual access to users, such as by subscription service. Thus, the user may not be required to have specific hardware or software that functions as the remote server 32 itself.

After the diagnostic trouble code, or other data, is sent to the external database, the external database may provide the requested diagnostic analysis, e.g. the diagnostic summary 14, to the computer 28 via the electronic communications link. The diagnostic summary 14 may include one or more information result(s) 16 that are generated in response to receipt of the diagnostic trouble code and/or other diagnostic data, considered in isolation or in combination. The diagnostic summary 14 may be presented as a listing of information results 16, such as a line-by-line listing. The diagnostic summary 14 may be presented and organized according to the external database or category from which a given information result 16 is retrieved. For example, the diagnostic summary 14 may be divided into various linked categories or levels of supplemental information according to system 18, subsystem, component, or other classification, in order to facilitate ready access and understanding by the user. The diagnostic summary 14 may serve as a "top-level" summary of data in a data organization structure. Accordingly, the user may also be able to access additional linked levels or "bottom-levels" of data by "clicking-in" or selecting a given information result 16, as discussed below.

According to an aspect of the present invention, one of the external databases that may be accessed (via touch screen selection on a segment of the diagnostic summary 14) is a raw database 40. In such case, the raw data result may include information related to system specifications, manufacturer information, and/or system descriptions. The raw database 40 may provide information on a general level, such as general information about a given system 18. In the case of an automobile, the raw database 40 may provide make, model, engine specifications, and specifications of all of the various systems 18 of the automobile.

Another external database that may be accessed (via selection from information in the diagnostic summary 14), is a technical service bulletin (TSB) database 42. The TSB database 42 may also provide a listing of common problems discovered in certain years and models of a given vehicle 20, as well as the identified causes or solutions to those problems. The TSB database may also include diagnostic procedures, repair procedures, known problems, notifications about parts (either new and/or improved), warranty information, and service manual updates.

Other various external databases of information pertinent to the system(s) 18 and diagnostic data may also be similarly accessed and included in the diagnostic summary 14. Such other databases 44 may include electronic resources such as volumes of diagnostic manuals, books and other materials providing detailed information on any given vehicle 20 or system problem or solution. Yet other databases 44, such as computer programs, vehicle data/programming uploads and online manuals may also be available for reference and diagnostic purposes. Additionally, online or telephonic databases including experts, other mechanics, and/or technicians may be available to personally assist the mechanic and to answer any questions, e.g. by voice over internet protocol (VOIP) where the remote communications interface supports such communication. Therefore, the tablet 10 may access such databases as may be useful in order to provide an organized listing and presentation of the diagnostic summary 14 and information results 16.

Referring to FIGS. 1-2 and 4, the computer 28 is in electrical communication with the display screen 22. In accordance with an implementation of the present invention, the computer 28 may be configured to receive and to selectively transmit the diagnostic data to the display screen 22 for user review. For example, the tablet 10 may be operative to display diagnostic data from multiple input modules 12 simultaneously, which feature may allow the user to compare and contrast diagnostic data that may be useful, alone or in combination, to assist in diagnosis of a vehicle condition. A user may access and compare layers of information related to diagnostic data received from each module. Further, the diagnostic data may include prior and current diagnostic data from each module, as discussed further below. As each module is selected the related data may be presented, and links enabled to access further related data or support from multiple available sources. In addition, the tablet 10 may be operative to display diagnostic data from multiple input modules 12 on a single display chart in order to facilitate ready comparison and use of the diagnostic data.

As such, the computer 28 may be configured as organize diagnostic data as desired by the mechanic to generate a diagnostic summary 14 or other data on the display screen 22 for user review. The diagnostic summary 14 may be presented as a listing of information results 16, such as a line-by-line listing, as illustrated in FIGS. 1 and 2. The diagnostic summary 14 may be presented alongside other diagnostic data, such as graphs, charts, and the like, or may be presented on separate, linked pages of layered data. As discussed above, the diagnostic summary 14 may be organized according to the external database or category from which a given information result 16 is retrieved. The diagnostic summary 14 may be layered or divided into various categories or levels according to system 18, subsystem, component, or other classification. Thus, the user may readily evaluate the diagnostic data and diagnostic summary(s) 14 in order to decide which information result(s) 16 to access, as may be most helpful in solving a particular problem.

Figure 3:
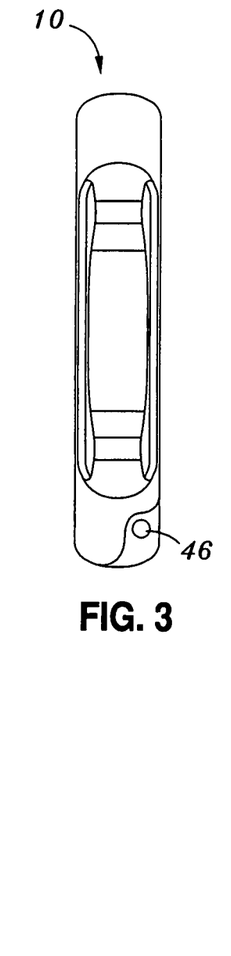
FIG. 3 is side view of the tablet shown in FIG. 2.

After reviewing the diagnostic summary 14 and deciding which information result(s) 16 to choose, the user may select the chosen information result(s) 16. As noted above, the display screen 22 may be a touch-sensitive screen that is configured to enable user selection of the information result 16 displayed in the diagnostic summary 14. As shown in FIGS. 1-3, the tablet 10 may also include a stylet 46 for use with the touch-sensitive screen in order to select the information result 16 and operate the tablet 10. The tablet 10 may also include other selection devices that allow the user to select a given information result 16.

Once the user selects a given information result 16, the computer 28 is configured to download the selected information result 16 in response to the user selection via the electronic communications link. The information result 16 may be a document or file that includes a very detailed description of a given point of interest related to the selected diagnostic data from a selected input module, such as system specifications, manufacturer information, system descriptions, make, model, engine specifications, diagnostic procedures, repair procedures, known problems, notifications about parts, warranty information, and/or service manual updates, to name a few. As discussed above, just as the diagnostic summary 14 is typically a "top-level" summary of data in a data organization structure, the information result 16 may represent or link to "bottom-level" data from the organizational information structure, e.g. a very informative, thorough, and exhaustive explanation or description of a given subject. Accordingly, some information results 16 may be very short and concise due to their nature, however, other information results 16 may be substantially large files. Information results 16 may include not only text, but may also include audio and visual information, such as charts, pictures, graphs, drawings, video, etc., which is illustratively shown in FIGS. 1 and 2. Thus, instead of being subject to the organization and presentation of other sources, the user may thus use their own prerogative to advance through the diagnostic process. The user may thus selectively access live data or download a given information result 16 as deemed pertinent to the user's work.

In displaying the diagnostic data, diagnostic summary 14, and/or information result 16, the computer 28 may use a variety of visually perceptible formats, such as graphs, charts, tables and other such formats. In this regard, formats of presentation may depend upon the system 18 being analyzed. The tablet 10 may be configurable to allow the user to switch between the various types of formats, e.g. single screen, dual screen, etc., according to the preferences of the user or otherwise. The objective in selecting appropriate formats of presentation is to ensure that the user is able to readily understand and analyze the diagnostic data, diagnostic summary 14, and/or information result 16 in a productive and meaningful way.

According to one of the unique aspects of the present invention, it is contemplated that the diagnostic data, diagnostic summary 14, and/or information result 16 related to multiple systems 18 may be jointly presented and/or combined in a single format of presentation. Thus, as illustrated in FIGS. 1 and 2, the display screen 22 should preferably be sized and configured to allow the visual display of several formats of diagnostic data that allows the user to thread, compare and evaluate related data from various sources. In some embodiments, the tablet 10 should be configured to be at least 8"×10" in size. The display screen 22 is preferably sized to occupy nearly an entire face of the tablet 10. Further, a touch-sensitive screen may allow the user to easily handle and manage presentation of the diagnostic data, diagnostic summary 14, and/or information result 16. Finally, the computer 28 may also be configured to use various types of computer programs, such as operating systems compatible with standard computer systems in order to facilitate use, transfer and printing of the diagnostic data, diagnostic summary 14, and/or information result 16. In addition, the computer 28 may be configured to allow for communicating the diagnostic data, diagnostic summary 14, and/or information results 16 to another computer 28 or peripheral.

According to yet another aspect of the present invention, the tablet 10 may include a memory unit that is operative to store a prior diagnostic data for a given system 18. In one implementation, the tablet 10 may display prior diagnostic data of a particular system 18 as well as a current diagnostic data for the same given system 18 in order to allow the user to compare the prior and current diagnostic data. Thus, the format of presentation may be variously configured in order to ensure that the diagnostic data of the various systems 18 are presented in an effective manner. For example, the display screen 22 may feature a partitioned presentation of data and be subdivided into multiple sections, such as shown in FIGS. 1 and 2. Each subdivision of the presentation may include at least one of a graph, a chart, or a table that presents the diagnostic data in an intelligible and useful way. This presentation may make the diagnostic data more readily understood by the user. In addition, as mentioned above, the presentation of diagnostic data may also be superimposed upon prior diagnostic data or upon other systems 18 in order to facilitate comparative analysis of the diagnostic data. Furthermore, the memory may also store diagnostic data, diagnostic summary 14, and/or information result 16 of the given system 18 for later review.

Thus, as one of the innovative aspects of embodiments of the present invention, the tablet 10 may retrieve a diagnostic trouble code related to the system 18 and use the diagnostic trouble code to retrieve germane and useful data from various databases. The diagnostic summary 14 may then be presented to the mechanic in an organized manner and simplified in order to allow the mechanic to selectively access information results 16 according to the mechanic's own preferences and initiative; the mechanic thus becomes the master of the information and may download and view only that information and data that he/she deems pertinent to the problem, thereby mitigating inefficiencies in the utilization of resources.

Upon review of the information and data, the mechanic may selectively download the information result(s) 16 as he/she determines to be useful in order to solve the vehicle 20 problem. Thus, instead of relying on external resources to diagnose or solve the problem, the mechanic is able to proactively configure and develop the diagnostic solution process. The actions of the mechanic are no longer dictated by remote third parties and programs that allow the mechanic little or no control over the diagnostic solution process. The tablet 10 therefore centralizes all information, knowledge, and data to the mechanic, thus allowing the mechanic to efficiently diagnose and solve many types of vehicle 20 problems that may arise. Accordingly, embodiments of the present invention provide the user with substantially more control over access, display and use of diagnostic information, thus enhancing the efficiency of the diagnostic process.

After the diagnostic data and/or information results have been displayed on the display screen 22, the user may then be enabled to remedy any malfunctions in any of the systems 18 by appropriate corrective action. As mentioned above, such corrective action may be suggested by the diagnostic data, diagnostic summary 14, and/or information results 16. In preferred embodiments, the presentation of both malfunctions and probably solutions may enable even inexperienced users to understand the necessary course for corrective action.

Figure 5:
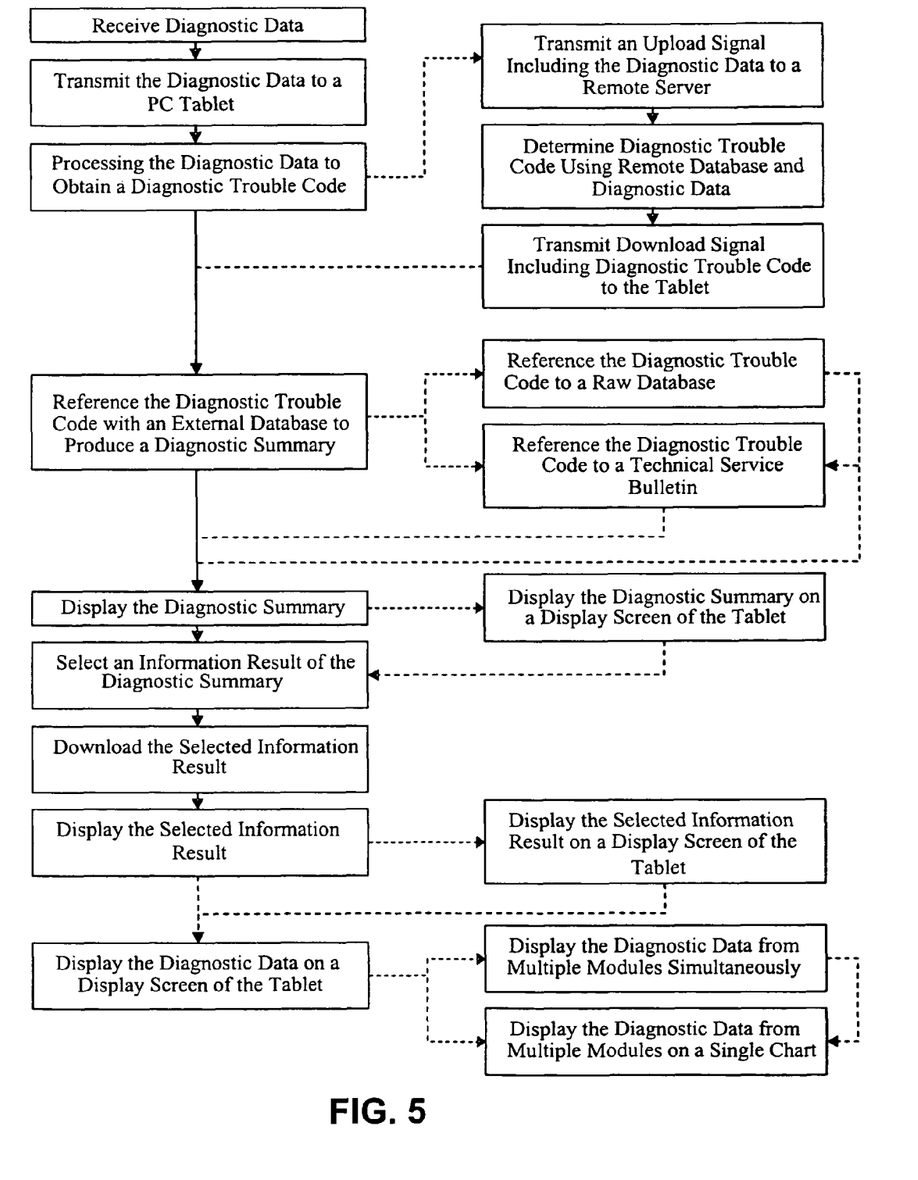
FIG. 5 is a flowchart illustrating exemplary steps in a diagnostic method according to an embodiment of the present invention.

In accordance with yet another embodiment of the present invention, as illustrated in FIG. 5, a diagnostic method is also provided. The method comprises the steps discussed above, specifically: receiving sensed diagnostic data from the system 18; processing the diagnostic data to obtain the diagnostic trouble code correlated to the system status; referencing the diagnostic trouble code or other diagnostic data with the external database(s) to produce the diagnostic summary 14, the diagnostic summary 14 including the information result 16 being correlated to the diagnostic data; displaying the diagnostic summary 14 for review; selecting one or more information result(s) 16 of the diagnostic summary 14; downloading data related to the selected information result 16 to the diagnostic PC tablet 10; and displaying the data and/or selected information result 16 for review.

FIG. 5 also illustrates an implementation of the method wherein the referencing step may include referencing the diagnostic trouble code to a trouble code descriptor(s) stored in a local database in the tablet or remotely. Alternatively the reference data may include diagnostic procedures, repair procedures, known problems, notifications about parts (either new and/or improved), warranty information, and/or service manual updates.

According to another embodiment of the method, illustrated again in FIG. 5, the displaying the diagnostic summary 14 step may include displaying the diagnostic summary 14 for review on the display screen 22 of the diagnostic PC tablet 10, as discussed above. The displaying the selected information result 16 step may include displaying the selected information result(s) 16 on the display screen 22 of the diagnostic PC tablet 10, as also discussed above. The displaying the diagnostic data step may include displaying the diagnostic data from multiple input modules 12 simultaneously and/or displaying the diagnostic data from multiple modules 12 on a single display chart, as also discussed above.

Furthermore, the selecting the information result 16 step may include using a touch-sensitive screen to select the information result 16 of the diagnostic summary 14, as discussed above. Finally, as shown in FIG. 5, the step of processing the diagnostic data may include: transmitting the upload signal 34, which is representative of the diagnostic data, to the remote server 32; utilizing the remote database(s) 38 on the remote server 32 to analyze the diagnostic condition in response to the diagnostic trouble code and/or other diagnostic data from the upload signal 34; and transmitting the download signal 36 to the tablet 10 from the remote server 32 being representative of that analysis.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A diagnostic method comprising:
receiving in a hand held device sensed diagnostic data from a vehicle, the diagnostic data being representative of a vehicle system status;
transmitting an upload signal including information representative of the diagnostic data to at least one remote database to produce to diagnostic summary, the diagnostic summary including a plurality of selectable top level information results, each top level information result being associated with a plurality of bottom level information links, each bottom level information link being associated with remotely located bottom level data including at least one of data functionally related to the diagnostic data and reference materials associated with the diagnostic data, the plurality of bottom level information links being accessible in response to selection of the respective top level information result, the bottom level data being accessible in the hand held device in response to selection of the respective bottom level information link;
formatting the diagnostic summary for display at the hand held device in accordance with formatting instructions provided by a user;
displaying the diagnostic summary for review in the hand held device;
selecting a first one of the plurality of top level information results of the diagnostic summary;
displaying the bottom level information links associated with the one of the plurality of top level information results;
selecting one of the plurality of bottom level information links;
downloading the bottom level data associated with the selected first one of the top level information results; and
displaying the bottom level data associated with the selected first one of the top level information results for review in the hand held device simultaneously with display of the diagnostic summary.

2. The method of claim 1 wherein the bottom level data includes at least one of system specifications, manufacturer information, and system descriptions.

3. The method of claim 1 wherein the bottom level data includes a technical service bulletin to produce a TSB result.

4. The method of claim 3 wherein the TSB result includes at least one of diagnostic procedures, repair procedures, known problems, notifications about parts, warranty information, and service manual updates.

5. The method of claim 2 further including the step of communicating diagnostic instructions to the vehicle system in response to the diagnostic information and the selected result(s).

6. The method of claim 1 limber comprising the step of transmitting a download signal to the hand held device from the at least one remote database, the download signal being representative of the diagnostic summary.

7. A method of diagnosing vehicle conditions comprising:
linking a handheld device to is vehicle system;
receiving in the handheld device diagnostic data from the vehicle system, the diagnostic data being representative of a vehicle system status;
displaying the vehicle diagnostic data on the handheld device;
receiving at the handheld device diagnostic information from a plurality of diagnostic resource databases, the diagnostic information including a diagnostic summary comprising a plurality of selectable top level inhumation results, each top level information result being associated with a plurality of bottom level information links, each bottom level information link being associated with remotely located bottom level data including at least one of data functionally related to the diagnostic data and reference materials associated with the diagnostic data, the plurality of bottom level information links being accessible in response to selection of the respective top level information result, the bottom level data being accessible in response to selection of the associated bottom level information link;
formatting the diagnostic summary for display at the hand held device in accordance with formatting instructions provided by a user;
displaying in the handheld device the diagnostic summary;
selecting a first one of the top level information results of the diagnostic summary;
displaying bottom level information links associated with the first one of the top level information results;
selecting a first one of the bottom level information link associated with the first one of the top level information results;
downloading the bottom level data associated with the selected first one of the bottom level information links to the hand held device; and
displaying the downloaded bottom level data associated with the selected first one of the bottom level information links in the hand held device simultaneously with the display of the diagnostic summary.

8. The method as recited in claim 7 wherein at least one of the diagnostic resource databases is disposed internal to the handheld device.

9. The method as recited in claim 7 wherein each of the diagnostic resource databases is disposed external to the handheld device.

10. The method as recited in claim 9 wherein each of the diagnostic resource databases is linked to the handheld device via the worldwide web.

11. The method as recited in claim 7 wherein the vehicle diagnostic data and the diagnostic information are displayed simultaneously on the handhold device.

12. The method as recited in claim 7 wherein the vehicle diagnostic data and the diagnostic information are displayed alternately on the handheld device.

13. The method as recited in claim 7 further comprising the step of receiving and displaying in the hand held device real time diagnostic data from the vehicle system.

14. The method as recited in claim 13 further comprising the step of displaying in the hand held device the real time diagnostic data from the vehicle system and diagnostic data previously received from the vehicle system substantially simultaneously.

15. The method as recited in claim 14 further comprising the step of communicating instructions for remedying a vehicle condition to the vehicle system.

16. The method of claim 1, wherein the reference materials associated with the diagnostic data includes warranty information.

17. The method of claim 1, wherein the supplemental information includes supplemental vehicle system data.

18. The method of claim 1, further comprising the step of processing the diagnostic data in the hand held device to obtain diagnostic information correlated to the vehicle system status.

19. The method of claim 1, wherein the step of receiving in the hand held device sensed diagnostic data from the vehicle includes receiving data from a vehicle onboard computer.

20. The method of claim 19, further comprising the steps of:
selecting a second one of the plurality of top level information results of the diagnostic summary; and
displaying the bottom level data associated with the second one of the top level information results simultaneously with the display of the bottom level data associated with the first one of the top level information results;
wherein the bottom level data associated with first one of the information results is representative of the data related to a first vehicle system, and the bottom level data associated with the second one of the information results is representative of data related to a second vehicle system.

21. The method of claim 7 wherein the step of receiving in the handheld device sensed a diagnostic data from the vehicle includes receiving data from a vehicle onboard computer.

22. The method of claim 21 further comprising the steps of:
selecting a second one of the plurality of top level information results of the diagnostic summary;
displaying bottom level information links associated with the second one of the top level information results;
selecting a second one of the bottom level information links associated with the second on of the top level information results;
downloading bottom level data associated with the selected second one of the bottom level information links to the handheld device; and
displaying the downloaded bottom level data associated with the second one of the bottom level information links in the handheld device simultaneously with the display of the diagnostic summary;
wherein the bottom level data associated with the first one of the bottom level information links is representative of data related to a first vehicle system, and the bottom level data associated with the second one of the information links is representative of data related to a second vehicle system.

23. The method of claim 1, further comprising the step of formatting the bottom level data associated, with the selected first one of the top level information results In accordance with formatting instructions provided by the user.

24. The method of claim 1, further comprising, the step of receiving formatting instructions from the user, the formatting instructions pertaining to the layout of information displayed on the hand held device.

25. The method of claim 24, wherein the formatting instructions include displaying information on the hand held device in a split screen format.

26. The method of claim 1, further comprising the step of resizing the display of the diagnostic summary to accommodate simultaneous display with the bottom level data associated with the selected first one of the top level information results.

\* \* \* \* \*